(12) United States Patent
Yasui (10) Patent No.: US 11,558,356 B2
(45) Date of Patent: Jan. 17, 2023

(54) INFORMATION PROCESSING APPARATUS

(71) Applicant: FUJIFILM Business Innovation Corp., Tokyo (JP)

(72) Inventor: Masahiro Yasui, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 69 days.

(21) Appl. No.: 16/924,128

(22) Filed: Jul. 8, 2020

(65) Prior Publication Data

US 2021/0297392 A1 Sep. 23, 2021

(30) Foreign Application Priority Data

Mar. 23, 2020 (JP) .............................. JP2020-050657

(51) Int. Cl.
| | | |
|---|---|---|
| *G06F 21/00* | (2013.01) | |
| *H04L 9/40* | (2022.01) | |
| *H04L 51/046* | (2022.01) | |
| *G06F 21/62* | (2013.01) | |

(52) U.S. Cl.
CPC ...... *H04L 63/0414* (2013.01); *G06F 21/6263* (2013.01); *H04L 51/046* (2013.01); *H04L 63/0421* (2013.01)

(58) Field of Classification Search
None
See application file for complete search history.

(56) References Cited

U.S. PATENT DOCUMENTS

| | | | | |
|---|---|---|---|---|
| 8,150,416 | B2* | 4/2012 | Ribaudo | H04L 51/32 455/456.1 |
| 9,258,264 | B1* | 2/2016 | Shoham | G06Q 30/0201 |
| 10,160,542 | B2* | 12/2018 | Myslinski | G06Q 50/26 |
| 2003/0037110 | A1* | 2/2003 | Yamamoto | H04L 51/20 709/204 |
| 2005/0198031 | A1* | 9/2005 | Pezaris | H04L 51/32 707/999.009 |
| 2008/0226257 | A1* | 9/2008 | Asanuma | H04N 5/63 386/292 |
| 2009/0055477 | A1* | 2/2009 | Flesher | H04L 63/302 709/204 |
| 2009/0077616 | A1* | 3/2009 | Lindholm | H04L 63/20 726/1 |
| 2009/0165098 | A1* | 6/2009 | Ifrah | G06Q 20/02 705/317 |
| 2010/0274634 | A1* | 10/2010 | Ifrah | G06Q 20/40 726/30 |
| 2010/0274815 | A1* | 10/2010 | Vanasco | G06F 16/9024 707/798 |

(Continued)

FOREIGN PATENT DOCUMENTS

| | | |
|---|---|---|
| JP | 2014067358 | 4/2014 |
| JP | 6145614 | 6/2017 |

*Primary Examiner* — Maung T Lwin
(74) *Attorney, Agent, or Firm* — JCIPRNET (57) ABSTRACT

An information processing apparatus includes a processor configured to determine a relationship between a first user and a second user who exchange a message, determine propriety of personal information included in the message from the first user to the second user based on the determined relationship, and perform processing related to the personal information based on the determined propriety.

11 Claims, 10 Drawing Sheets

| DISCLOSURE TENDENCY | USER RELATIONSHIP | PERSONAL INFORMATION INAPPROPRIATE TO MESSAGE |
|---|---|---|
| AGGRESSIVE | Lv1 | ADDRESS, TELEPHONE NUMBER, OCCUPATION |
| | Lv2 | ADDRESS |
| | Lv3 | NONE |
| INTERMEDIATE | Lv1 | ADDRESS, TELEPHONE NUMBER, OCCUPATION, HOBBY, SPECIAL SKILL |
| | Lv2 | ADDRESS, TELEPHONE NUMBER |
| | Lv3 | NONE |
| PASSIVE | Lv1 | ADDRESS, TELEPHONE NUMBER, OCCUPATION, HOBBY, SPECIAL SKILL |
| | Lv2 | ADDRESS, TELEPHONE NUMBER, OCCUPATION |
| | Lv3 | ADDRESS, TELEPHONE NUMBER |

(56) References Cited

U.S. PATENT DOCUMENTS

| | | | |
|---|---|---|---|
| 2011/0061089 A1* | 3/2011 | O'Sullivan | H04L 63/102 726/1 |
| 2013/0139048 A1* | 5/2013 | Dhawan | G06Q 10/101 715/234 |
| 2014/0123299 A1* | 5/2014 | Jung | G06F 21/62 726/26 |
| 2016/0148018 A1* | 5/2016 | Sugiura | H04L 51/52 726/28 |
| 2020/0007353 A1* | 1/2020 | Wang | H04L 12/1822 |
| 2020/0327252 A1* | 10/2020 | Mcfall | G06F 21/602 |
| 2021/0021574 A1* | 1/2021 | Gilboy | H04W 12/02 |

* cited by examiner

| NUMBER OF MESSAGES | USER RELATIONSHIP |
|---|---|
| LESS THAN Th1 | Lv1 |
| EQUAL TO OR LARGER THAN Th1 OR LESS THAN Th2 | Lv2 |
| EQUAL TO OR LARGER THAN Th2 | Lv3 |

FIG. 6

| NUMBER OF PIECES OF COMMON REGISTRATION INFORMATION | USER RELATIONSHIP |
|---|---|
| LESS THAN Th11 | Lv1 |
| EQUAL TO OR LARGER THAN Th11 OR LESS THAN Th12 | Lv2 |
| EQUAL TO OR LARGER THAN Th12 | Lv3 |

FIG. 7

| USER RELATIONSHIP | PERSONAL INFORMATION INAPPROPRIATE TO MESSAGE |
|---|---|
| Lv1 | ADDRESS, TELEPHONE NUMBER, OCCUPATION, HOBBY, SPECIAL SKILL |
| Lv2 | ADDRESS, TELEPHONE NUMBER |
| Lv3 | NONE |

| DISCLOSURE TENDENCY | USER RELATIONSHIP | PERSONAL INFORMATION INAPPROPRIATE TO MESSAGE |
|---|---|---|
| AGGRESSIVE | Lv1 | ADDRESS, TELEPHONE NUMBER, OCCUPATION |
| AGGRESSIVE | Lv2 | ADDRESS |
| AGGRESSIVE | Lv3 | NONE |
| INTERMEDIATE | Lv1 | ADDRESS, TELEPHONE NUMBER, OCCUPATION, HOBBY, SPECIAL SKILL |
| INTERMEDIATE | Lv2 | ADDRESS, TELEPHONE NUMBER |
| INTERMEDIATE | Lv3 | NONE |
| PASSIVE | Lv1 | ADDRESS, TELEPHONE NUMBER, OCCUPATION, HOBBY, SPECIAL SKILL |
| PASSIVE | Lv2 | ADDRESS, TELEPHONE NUMBER, OCCUPATION |
| PASSIVE | Lv3 | ADDRESS, TELEPHONE NUMBER |

INFORMATION PROCESSING APPARATUS

CROSS-REFERENCE TO RELATED APPLICATIONS

This application is based on and claims priority under 35 USC 119 from Japanese Patent Application No. 2020-050657 filed Mar. 23, 2020.

BACKGROUND

(i) Technical Field

The present invention relates to an information processing apparatus.

(ii) Related Art

JP2014-067358A discloses a technique for calculating an intimacy level for each partner user based on at least the number of messages transmitted from the partner user, and displaying user information on the partner user in a display aspect associated with the intimacy level on the partner user viewed from a terminal user.

SUMMARY

A service is provided in which users exchange a message with each other. In the service, a message including personal information capable of specifying an individual can be exchanged. Here, even in a case of the same personal information, for example, there is a case where the individual may want the personal information to be known to an intimate partner but does not want to be known to a non-intimate partner.

Aspects of non-limiting embodiments of the present disclosure relate to an information processing apparatus that appropriately manages a partner to which the personal information is informed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to determine a relationship between a first user and a second user who exchange a message, determine propriety of personal information included in the message from the first user to the second user based on the determined relationship, and perform processing related to the personal information based on the determined propriety.

BRIEF DESCRIPTION OF THE DRAWINGS

Exemplary embodiment(s) of the present invention will be described in detail based on the following figures, wherein.

DETAILED DESCRIPTION

[1] Example

Figure 1:
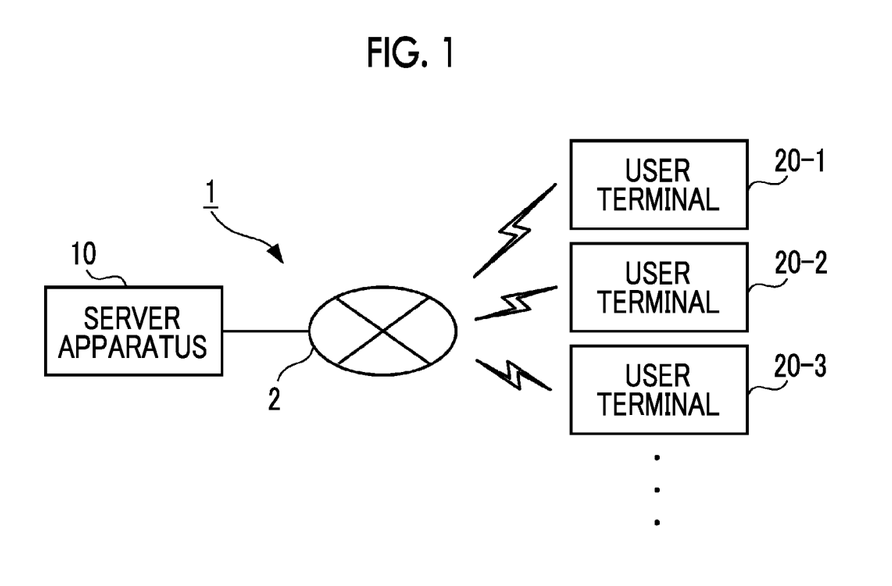
FIG. 1 is a diagram showing an overall configuration of a personal information management support system according to an example.

FIG. 1 shows an overall configuration of a personal information management support system 1 according to an example. The personal information management support system 1 is a system that performs processing of managing personal information included in a message exchanged between users. The message is exchanged through e-mail, chat, posting on a Social Networking Service (SNS), or the like.

The personal information is information that can specify an individual user, and includes a name, a date of birth, an address, an affiliated company and department name, an affiliated school and class name, an occupation, a place of work, annual income, a hobby, a photograph in which the user is taken, a photograph taken by the user, and the like. Although an individual may be specified by one piece of personal information (for example, a case where only one person lives in an address), generally, the individual is specified by combining two or more pieces of personal information.

The personal information management support system 1 includes a communication line 2, a server apparatus 10, and a plurality of user terminals 20-1, 20-2, 20-3, . . . (in a case where each of the user terminals is not distinguished, referred to as a "user terminal 20"). The communication line 2 is a communication system including a mobile communication network, the Internet, and the like, and relays data exchange between apparatuses that access the communication system. The server apparatus 10 accesses the communication line 2 via wired communication, and the user terminal 20 accesses the communication line 2 via wireless communication. Note that, access to the communication line 2 may be performed in a wired or wireless manner.

The server apparatus 10 is an information processing apparatus that performs processing related to the message exchanged between the users, processing related to the personal information based on the acquired information, and the like. The user terminal 20 is a terminal used by the user who uses the personal information management support system, and includes, for example, a smartphone, a tablet terminal, a personal computer, and the like. Each user exchanges the messages using the user terminal 20.

Figure 2:
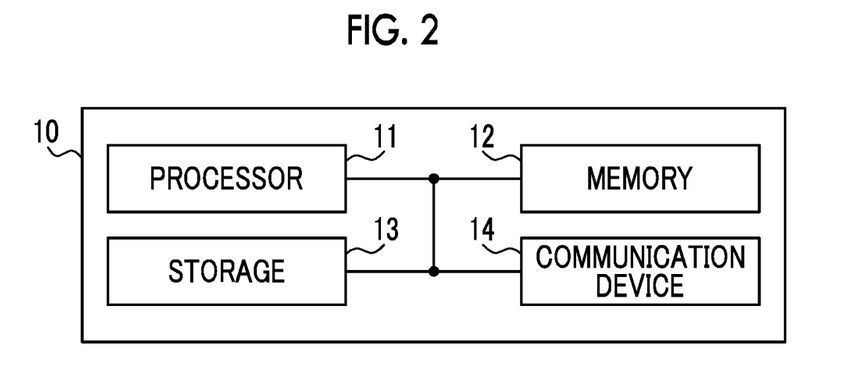
FIG. 2 is a diagram showing a hardware configuration of a server apparatus.

FIG. 2 shows a hardware configuration of the server apparatus 10. The server apparatus 10 is a computer including a processor 11, a memory 12, a storage 13, and a communication device 14. The processor 11 includes, for example, an arithmetic unit, such as a Central Processing Unit (CPU), a register, a peripheral circuit, and the like. The memory 12 is a recording medium that can be read by the processor 11, and includes a Random Access Memory (RAM) and a Read Only Memory (ROM).

The storage 13 is a recording medium that can be read by the processor 11, and includes, for example, a hard disk drive, a flash memory, or the like. The processor 11 controls an operation of each hardware by executing a program which uses the RAM as a work area and is stored in the ROM or the storage 13. The communication device 14 is a communication unit that includes an antenna, a communication circuit, and the like, and performs communication via the communication line 2.

Figure 3:
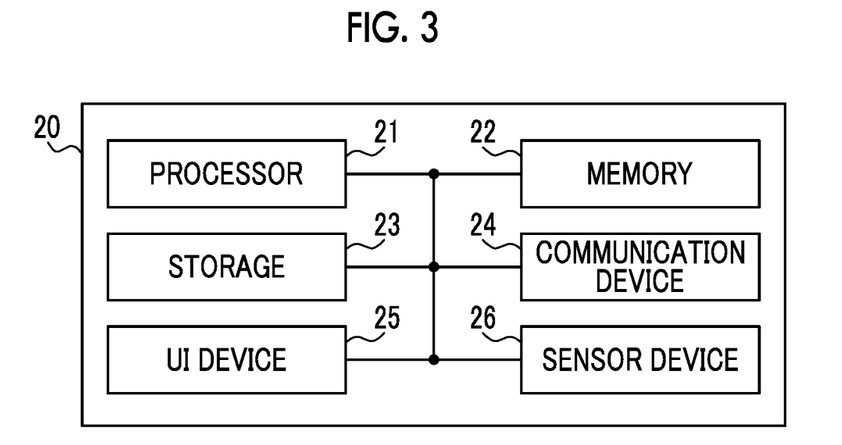
FIG. 3 is a diagram showing a hardware configuration of a user terminal.

FIG. 3 shows a hardware configuration of the user terminal 20. The user terminal 20 is a computer including a processor 21, a memory 22, a storage 23, a communication device 24, a User Interface (UI) device 25, and a sensor device 26. The processor 21 to the communication device 24 have the same type of hardware as the processor 11 to the communication device 14 shown in FIG. 2.

The UI device 25 is an interface provided to a user who uses the user terminal 20. The UI device 25 includes, for example, a touch screen having a display which is a display unit and a touch panel which is provided on a surface of the display, displays an image, and receives an operation from the user. In addition, the UI device 25 has operators, such as a keyboard in addition to the touch screen, and receives operations to the operators.

The sensor device 26 includes various sensors such as a positioning sensor, a speed sensor, an acceleration sensor, a temperature sensor, a humidity sensor, and an optical sensor. In the personal information management support system 1, the processor of each device executes the program to control each unit, thereby realizing each function which will be described below. The operation performed by each function is represented as an operation performed by the processor of the device that realizes the function.

Figure 4:
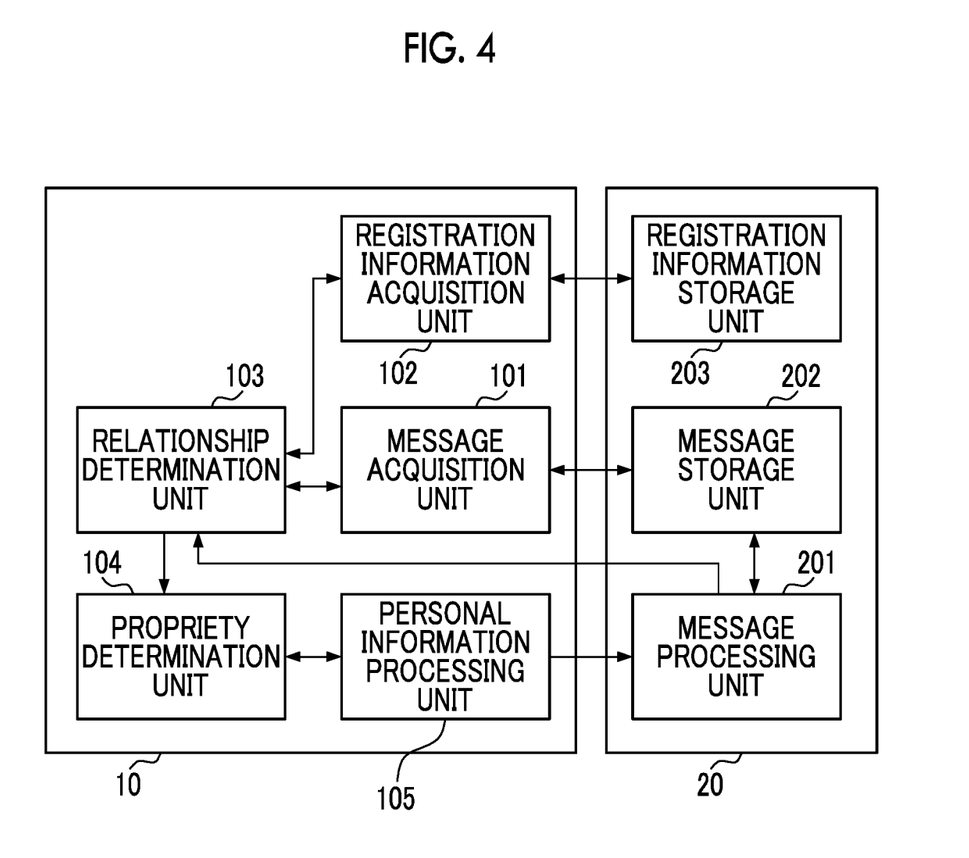
FIG. 4 is a diagram showing a functional configuration realized in the personal information management support system.

FIG. 4 shows a functional configuration realized in the personal information management support system 1. The server apparatus 10 includes a message acquisition unit 101, a registration information acquisition unit 102, a relationship determination unit 103, a propriety determination unit 104, and a personal information processing unit 105. The user terminal 20 includes a message processing unit 201, a message storage unit 202, and a registration information storage unit 203.

The message processing unit 201 of the user terminal 20 performs processing related to the exchange of the message between the users. The message processing unit 201 performs, for example, processing of generating the message (the e-mail, posting on the SNS, or the like) based on an input of the user, processing of changing the generated message based on the input of the user, processing of transmitting the generated or changed message, processing of displaying the received message, and the like.

In a case where the message processing unit 201 transmits the message to another user terminal 20, the transmitted message is supplied to the message storage unit 202. In addition, in a case where the message processing unit 201 receives the message from another user terminal 20, the received message is supplied to the message storage unit 202.

The message storage unit 202 stores the supplied message, that is, the message transmitted to the other user terminal 20 by the message processing unit 201, and the message received from the other user terminal 20 by the message processing unit 201. The message storage unit 202 stores the message in association with identification information (for example, a terminal Identification (ID)) for identifying the user terminal 20 of a transmission destination or a transmission source of the message.

The registration information storage unit 203 of the user terminal 20 stores registration information which is information registered in association with the user who uses the user terminal 20. The registration information includes, for example, a name of the user, an age, a date of birth, an address, an occupation, a hobby, a special skill, and a photograph of the user. The registration information includes information registered in association with an e-mail service and information registered in association with an SNS service. In addition, the registration information may include information registered in association with another service or application. In short, any information may be included in the registration information as long as the information is registered as information related to the user.

The message acquisition unit 101 of the server apparatus 10 acquires the message exchanged between the users. The message acquisition unit 101 transmits, to the user terminal 20, message request data requesting a message stored in a certain period in the past based on, for example, an instruction from the relationship determination unit 103 which will be described later. The message storage unit 202 of the user terminal 20 reads the message stored in the period indicated by the received message request data, and transmits the message to the server apparatus 10. The message acquisition unit 101 acquires the transmitted message and supplies the message to the relationship determination unit 103.

The registration information acquisition unit 102 of the server apparatus 10 acquires the registration information of the user. The registration information acquisition unit 102 transmits, to the user terminal 20, the registration information request data requesting registration information updated in the certain period in the past based on, for example, the instruction from the relationship determination unit 103 which will be described later. The registration information storage unit 203 of the user terminal 20 reads the registration information updated in the period indicated by the received registration information request data, and transmits the registration information to the server apparatus 10. The registration information acquisition unit 102 acquires the transmitted registration information, and supplies the registration information to the relationship determination unit 103.

The relationship determination unit 103 of the server apparatus 10 determines a relationship (hereinafter, referred to as a "user relationship") between a first user and a second user who exchange the message. The user relationship includes, for example, an intimacy level between the users, a degree of reliability between the users, and the like. In the example, the relationship determination unit 103 represents that the deeper the user relationship, the higher the level (the more intimate, the higher reliability).

In addition, the first user and the second user do not indicate specific users, and any users who exchange the message may be the first user and the second user. In a case where the message is generated based on the input of the user, the message processing unit 201 of the user terminal 20 transmits request data requesting an instruction of whether or not to use the personal information included in the generated message without change (hereinafter, also referred to as "propriety of the personal information") to the server apparatus 10.

The relationship determination unit 103 determines the user relationship by setting a user who is a destination of the message indicated by the received request data as the second user and the user who uses the user terminal 20 of a transmission source of the request data as the first user. In the example, the relationship determination unit 103 determines the user relationship using two methods. In a first method, the relationship determination unit 103 determines the user relationship based on the number of messages exchanged between the first user and the second user in the certain period in the past (hereinafter, referred to as a "determination period").

Figure 5:
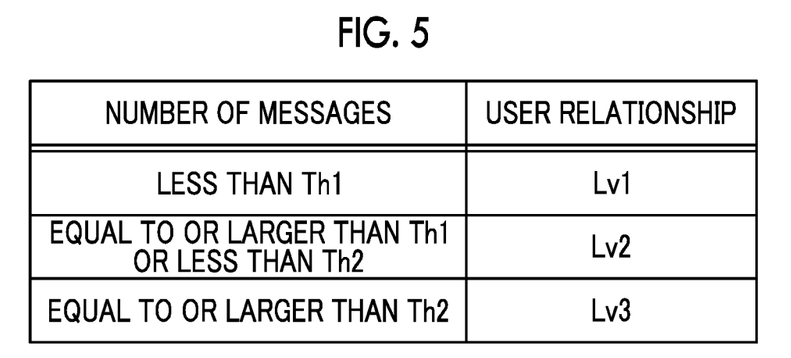
FIG. 5 is a diagram showing an example of a first relationship table.

The relationship determination unit 103 uses a first relationship table in which the number of messages is associated with the user relationship.

FIG. 5 shows an example of a first relationship table. In the example of FIG. 5, the user relationships "Lv1", "Lv2", and "Lv3" are associated with the number of messages "less than Th1", "equal to or larger than Th1 or less than Th2", and "equal to or larger than Th2".

In a case where a request from the message processing unit 201 of the user terminal 20 is received, the relationship determination unit 103 instructs the message acquisition unit 101 to transmit the message request data to the user terminal 20 of a request source. Here, the relationship determination unit 103 gives an instruction to transmit the message request data requesting only the messages of the first user and the second user described above. The message acquisition unit 101 transmits the message request data according to the instruction, and supplies the message transmitted in response to the message request data to the relationship determination unit 103.

The relationship determination unit 103 counts the number of supplied messages exchanged by the first user and the second user in the above-described determination period, and determines the user relationship associated with the counted number in the first relationship table as the user relationship between the first user and the second user. Note that, as a method of counting the number of messages, for example, weighting may be performed according to the sentence amount of the message (the weighting is performed as the sentence amount increases). In addition, different weighting may be performed on a message from the first user to the second user and a message from the second user to the first user.

Figure 6:
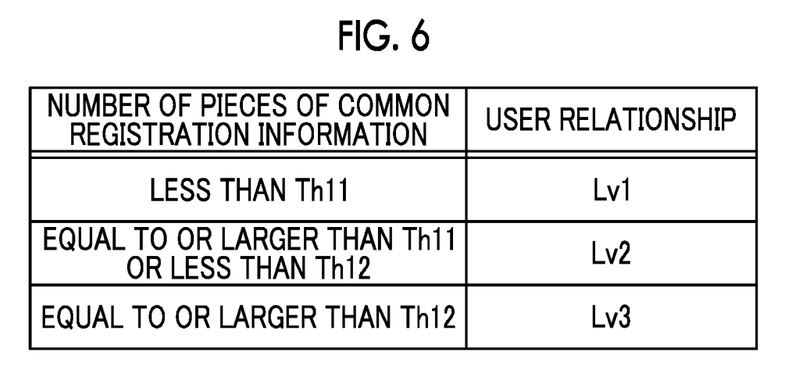
FIG. 6 is a diagram showing another example of a second relationship table.

In a second method, the relationship determination unit 103 determines the user relationship based on the number of pieces of registration information common to the registration information registered for the first user and the registration information registered for the second user. The relationship determination unit 103 uses a second relationship table in which the number of pieces of common registration information is associated with the user relationship.

FIG. 6 shows another example of the second relationship table. In the example of FIG. 6, the user relationships "Lv1", "Lv2", and "Lv3" are associated with the number of pieces of common registration information "less than Th11", "equal to or larger than Th11 and less than Th12", and "equal to or larger than Th12". In a case where the request is received from the message processing unit 201 of the user terminal 20, the relationship determination unit 103 instructs the registration information acquisition unit 102 to transmit the registration information request data to the user terminal 20 of the request source.

Here, the relationship determination unit 103 gives the instruction to transmit the message request data requesting only the above-described registration information of the first user and the second user. The registration information acquisition unit 102 transmits the registration information request data according to the instruction, and supplies the pieces of registration information transmitted in response to the registration information request data to the relationship determination unit 103. The relationship determination unit 103 counts the number of pieces of registration information common to both of the pieces of registration information of the first user and the second user, the pieces of registration information being supplied from the registration information storage unit 203.

The relationship determination unit 103 determines the user relationship associated with the counted number in the second relationship table as the user relationship between the first user and the second user. Note that, as a method of counting the number of pieces of common registration information, for example, different weighting may be performed on the specific registration information and the other pieces of registration information. The relationship determination unit 103 may count the number of pieces of common registration information by weighting the common registration information, such as a hobby or special skill, in which the users are more likely to be intimate, rather than the other registration information.

In a case where the relationship determination unit 103 determines different user relationships between the first method and the second method, for example, a higher level user relationship is employed (in a case where "Lv3" exists on one side, "it is determined to be "Lv3", and, in a case where "Lv3" does not exist but "Lv2" exists on one side, it is determined to be "Lv2"). Note that, the relationship determination unit 103 may employ a lower level user relationship on the contrary. The relationship determination unit 103 supplies a user relationship determination result to the propriety determination unit 104.

Figure 7:
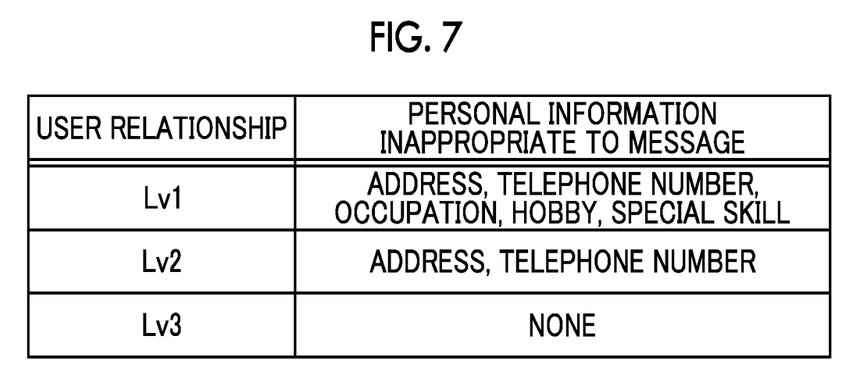
FIG. 7 is a diagram showing an example of a personal information table.

The propriety determination unit 104 determines the propriety of the personal information (whether or not to use the personal information included in the message without change) included in the message from the first user to the second user based on the user relationship determined by the relationship determination unit 103. The propriety determination unit 104 uses a personal information table in which the user relationships are associated with pieces of personal information inappropriate to be included in a message from the first user to the second user (inappropriate to the message).

FIG. 7 shows an example of the personal information table. In the example of FIG. 7, the user relationships "Lv1", "Lv2", and "Lv3" are associated with the pieces of personal information, such as "an address, a telephone number, an occupation, a hobby, a special skill", "an address, a telephone number", and "none", which are inappropriate to the message. In a case where the user relationship determination result is supplied from the relationship determination unit 103, the propriety determination unit 104 extracts the personal information inappropriate to the message, which is associated with the supplied user relationship in the personal information table.

In addition, the propriety determination unit 104 extracts the personal information from the message (message from the first user to the second user) indicated by the above-described request data transmitted from the message processing unit 201 of the user terminal 20. For example, the propriety determination unit 104 stores a keyword that is supposed to be included in the personal information in advance. As the keyword, for example, a place name, a specific number of digits including a specific number ("090xxxxxxxxx" or the like), a name of the occupation, a name of the hobby, a name of the special skill, or the like is used.

The propriety determination unit 104 divides a text string included in the message into, for example, words or phrases, and extracts a text string including the keyword from the text strings obtained through the division as the personal information. Note that, the personal information included in the message from the first user to the second user is the personal information of the first user in many cases because transmission of the personal information of another person to the other person is normally avoided. However, personal information of a user other than the first user may be included in the message in a case where the necessity is extremely high or in a case where personal permission is obtained. That is, the personal information included in the message is not limited to personal information of a specific user.

The propriety determination unit 104 determines whether or not the extracted personal information includes the above-described personal information inappropriate to the message. The propriety determination unit 104 supplies a determination result to the personal information processing unit 105. The personal information processing unit 105 performs the processing related to the personal information based on the propriety of the personal information determined by the propriety determination unit 104. In a case where it is determined that the personal information inappropriate to the message is not included, the personal information processing unit 105 transmits instruction data, to the user terminal 20, for giving an instruction to transmit the message using the personal information included in the message without change.

In addition, in a case where it is determined that the personal information inappropriate to the message is included, the personal information processing unit 105 performs processing of transmitting instruction data for giving an instruction to prohibit the transmission of the message including the personal information to the user terminal 20 as the processing related to the personal information in the example. The message processing unit 201 of the user terminal 20 transmits the message in a case where the instruction to transmit the message is received, and stops transmission of the message in a case where the instruction to prohibit the transmission of the message is received.

With the above configuration, each device included in the personal information management support system 1 performs instruction processing of giving an instruction to handle the personal information included in the message based on the user relationship.

Figure 8:
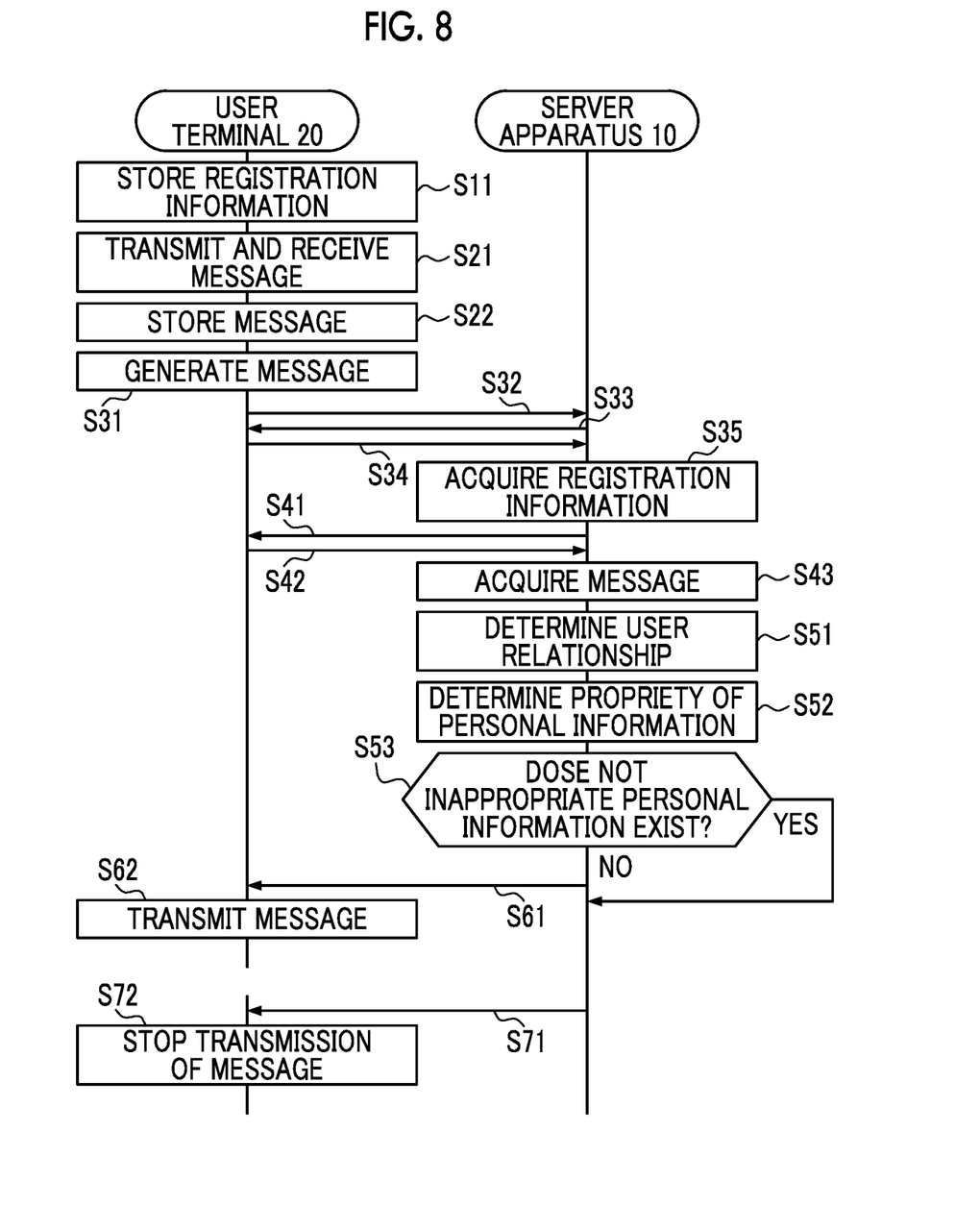
FIG. 8 is a diagram showing an example of an operational procedure in instruction processing.

FIG. 8 shows an example of an operational procedure in the instruction processing. First, the user terminal 20 (registration information storage unit 203) stores the registration information of the user who uses the user terminal (step S11). In addition, the user terminal 20 (message processing unit 201) transmits and receives the message to and from another user terminal 20 (step S21).

Next, the user terminal 20 (message storage unit 202) stores the message transmitted and received to and from another user terminal 20 (step S22). Note that, steps S11, S21, and S22 may be executed in opposite order or may be executed in parallel. Thereafter, it is assumed that the user terminal 20 (message processing unit 201) generates a message addressed to another user terminal 20 (step S31).

In that case, the user terminal 20 (message processing unit 201) transmits the request data for requesting the instruction for the propriety of the personal information to the server apparatus 10 (step S32). The server apparatus 10 (registration information acquisition unit 102) transmits the registration information request data to the user terminal 20 of the request source of the request data (step S33). The user terminal 20 (registration information storage unit 203) reads out the registration information indicated by the received registration information request data and transmits the registration information to the server apparatus 10 (step S34). The server apparatus 10 (registration information acquisition unit 102) acquires the transmitted registration information (step S35).

In addition, the server apparatus 10 (message acquisition unit 101) transmits the message request data to the user terminal 20 of the request source of the request data (step S41). The user terminal 20 (message storage unit 202) reads out the message indicated by the received message request data and transmits the message to the server apparatus 10 (step S42). The server apparatus 10 (message acquisition unit 101) acquires the transmitted message (step S43).

Note that, steps S33, S34, and S35 and steps S41, S42, and S43 may be executed in opposite order or may be executed in parallel. Next, the server apparatus 10 (relationship determination unit 103) determines the user relationship between the first user and the second user who exchange the message (step S51). Subsequently, the server apparatus 10 (propriety determination unit 104) determines the propriety of the personal information included in the message from the first user to the second user based on the determined user relationship (steps S52 and S53).

In a case where it is determined that the message does not include the personal information inappropriate for the transmission to the second user (NO) in step S53, the server apparatus 10 (personal information processing unit 105) transmits the instruction data for giving an instruction to transmit the message using the personal information included in the message without change to the user terminal 20 (step S61). The user terminal 20 (message processing unit 201) transmits the message as being instructed (step S62).

In a case where it is determined that the message includes the personal information inappropriate for the transmission to the second user (YES) in step S52, the server apparatus 10 (personal information processing unit 105) transmits the instruction data for giving the instruction to prohibit the transmission of the message to the user terminal 20 (step S71). The user terminal 20 (message processing unit 201) stops the transmission of the message as being instructed (step S72).

As described above, in the example, in a case where a level of the user relationship with the second user is low, the message including the personal information is not transmitted. A partner having a higher user relationship with the first user tends to keep faith with the first user, and, therefore, even though the personal information is known, there is low anxiety about misuse of the personal information (for example, to be known to another person). As described above, according to the example, appropriate management is performed such that the partner to which the personal information is informed does not become a partner who misuses the personal information.

In the example, since the transmission of the message including the personal information to the second user who has a low level of the user relationship is prohibited, the transmission of the personal information to an inappropriate partner is more reliably prevented, compared to a case where the transmission of the message is not prohibited. In addition, in the example, the user relationship is determined based on the exchange of the message between the first user and the second user, so that the user relationship is determined without any information other than the exchange of the message.

[2] Modified Example

The above-described example is merely an example of the implementation of the present invention, and may be modified as follows. In addition, the example and each modified example may be implemented through a combination as necessary.

[2-1] Processing Related to Personal Information

Figure 9:
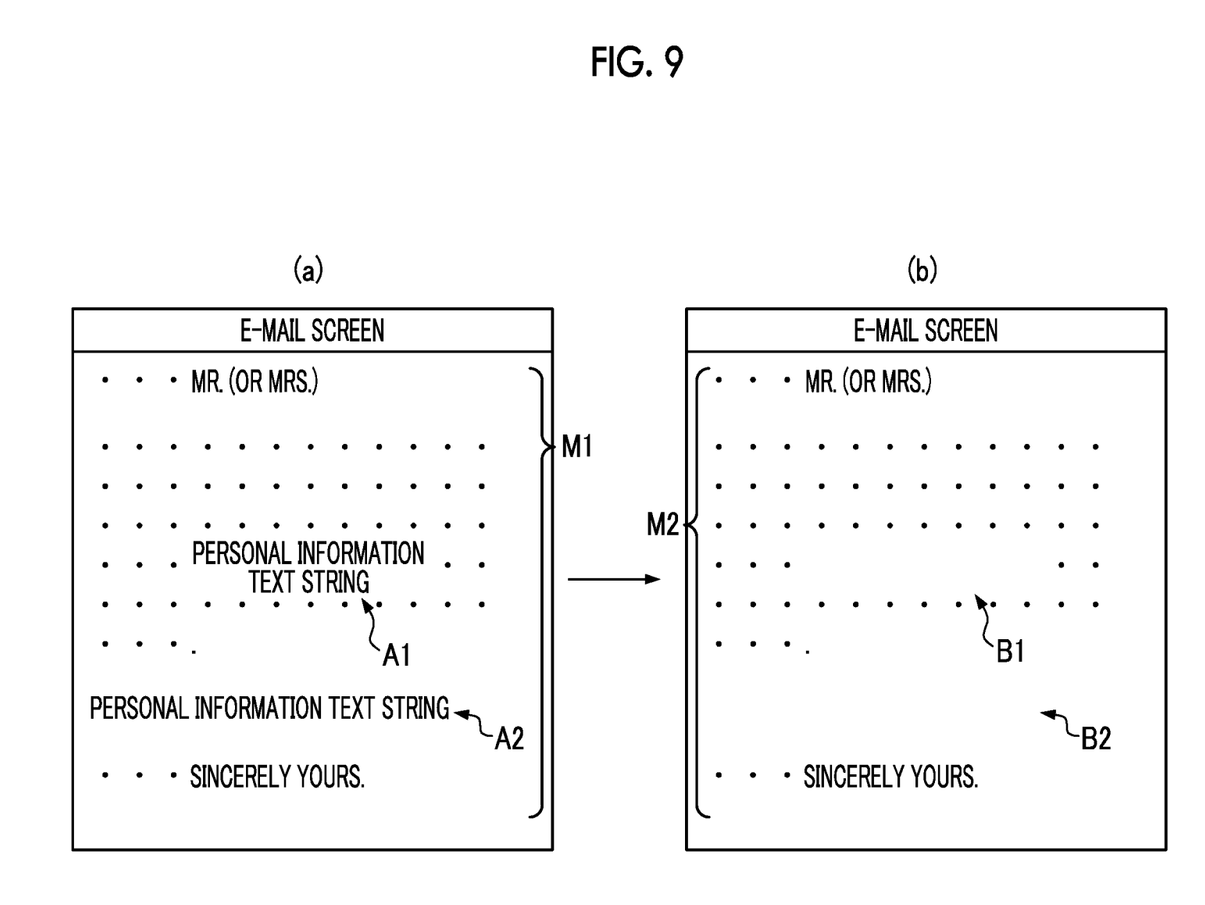
FIG. 9 is a diagram showing an example of processing related to personal information according to a modified example.

The personal information processing unit 105 may perform different processing (processing of prohibiting the transmission of the message) from the example as the processing related to the personal information. The personal information processing unit 105 performs, for example, processing of transmitting the message after deleting the personal information as the processing related to the personal information. The personal information processing unit 105 deletes the personal information, for example, by replacing the text string specified as the personal information with a specific symbol or the like (space, ".", or the like).

FIG. 9 shows an example of the processing related to the personal information according to the modified example. In (a) of FIG. 9, the message processing unit 201 displays an e-mail message M1 including personal information text strings A1 and A2. As shown in (b) of FIG. 9, the personal information processing unit 105 generates a message M2 including text string blank portions B1 and B2 represented by spaces (=blank) after deleting the personal information text strings A1 and A2.

The personal information processing unit 105 transmits message data indicating the generated message M2 to the user terminal 20. The message processing unit 201 of the user terminal 20 displays the message M2 indicated by the transmitted message data. In a case where the personal information of the message is deleted as above, transmission of the personal information to the inappropriate partner is more reliably prevented, compared to a case where the personal information is not deleted.

Figure 10:
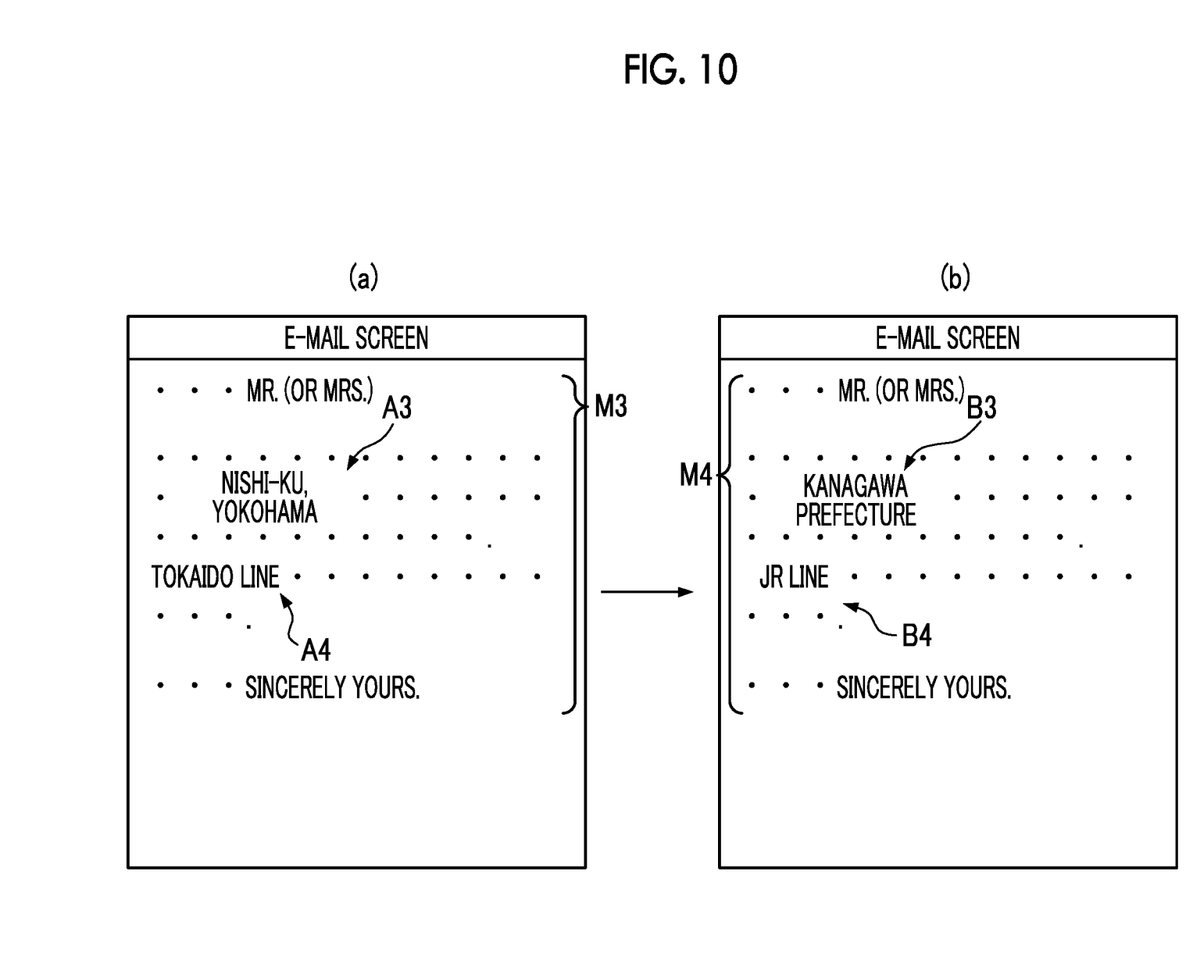
FIG. 10 is a diagram showing another example of the processing related to the personal information according to the modified example.

In addition, in the modified example, the personal information processing unit 105 performs processing of substituting the personal information with another information as the processing related to the personal information. Specifically, the personal information processing unit 105 substitutes the personal information with, for example, information, obtained through superordinate conceptualization performed on the personal information, as the above-described another information.

FIG. 10 shows another example of the processing related to the personal information according to the modified example. (a) of FIG. 10 shows an e-mail message M3 including a personal information text string A3 "Nishi-ku, Yokohama" and a personal information text string A4 "Tokaido Line".

The personal information processing unit 105 generates a message M4 including a replacement text string B3 obtained by replacing "Nishi-ku, Yokohama" indicated by the personal information text string A3 by "Kanagawa Prefecture" obtained through the superordinate conceptualization, and a replacement text string B4 obtained by replacing the "Tokaido Line" indicated by the personal information text string A4 by "JR line" obtained through the superordinate conceptualization. In a case where the higher conceptualization is performed on the personal information of the message in this manner, transmission of the detailed personal information to the inappropriate partner is more reliably prevented, compared to a case where the higher conceptualization is not performed.

Figure 11:
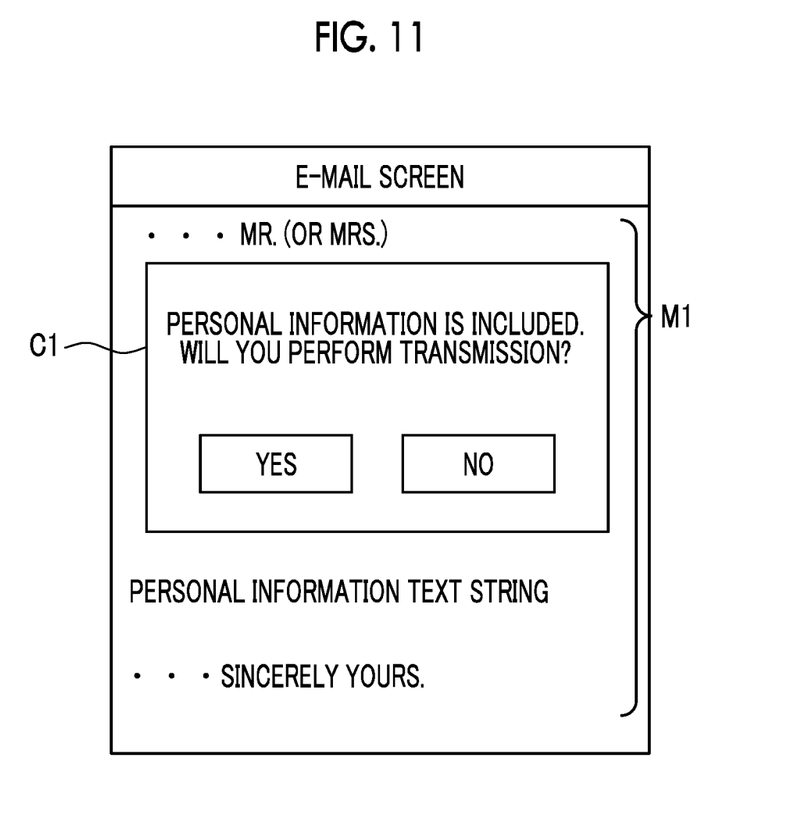
FIG. 11 is a diagram showing another example of the processing related to the personal information according to the modified example.

In addition, in the modified example, the personal information processing unit 105 performs processing of inquiring the first user as to whether or not to transmit the personal information as the processing related to the personal information.

FIG. 11 shows another example of the processing related to the personal information according to the modified example. FIG. 11 shows the message M1 including the personal information shown in FIG. 9, and an operator image C1 including a text string "The personal information is included. Will you perform transmission?", a Yes button, and a No button.

In a case where an operation of pressing the Yes button is performed, the message processing unit 201 transmits the message M1 without change. Further, in a case where an operation of pressing the No button is performed, the message processing unit 201 stops transmitting the message M1. In a case of inquiring the first user as to whether or not to transmit the message including the personal information, attention of the first user is called about informing of the personal information.

Figure 12:
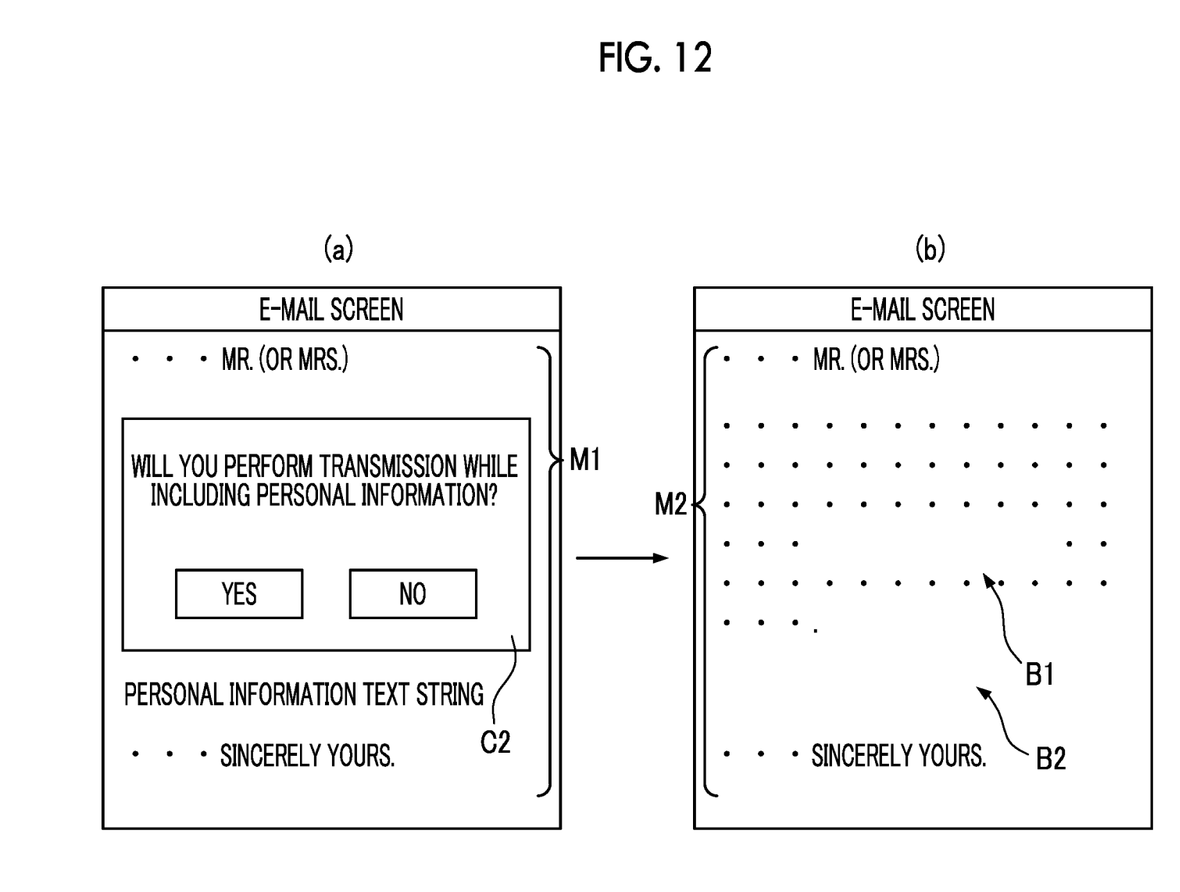
FIG. 12 is a diagram showing another example of the processing related to the personal information according to the modified example.

In addition, in the modified example, the personal information processing unit 105 performs the processing of inquiring the first user about propriety of the usage of the personal information as the processing related to the personal information.

FIG. 12 shows another example of the processing related to the personal information according to the modified example. (a) of FIG. 12 shows the message M1 including the personal information shown in FIG. 9, and an operator image C2 including a text string "Will you perform transmission while including the personal information?", the Yes button, and the No button.

In a case where the operation of pressing the Yes button is performed, the message processing unit 201 transmits the message M1 without change. In a case where the operation of pressing the No button is performed, the personal information processing unit 105 generates a message M2 from which the personal information is deleted, and the message processing unit 201 transmits the message M2. In a case of inquiring the first user about the propriety of the use of the personal information in this manner, the attention of the first user is called about informing of the personal information.

[2-2] First Determination Criterion of Propriety of Usage of Personal Information In the example, it can be said that, in a case where the user relationship determined by the relationship determination unit 103 satisfies a decided criterion, the propriety determination unit 104 determines that the usage of the personal information included in the message is appropriate. The criterion in the example is satisfied in a case where a type of the message does not include the personal information determined according to the determined user relationship (a type of the personal information associated with the user relationship in the personal information table shown in FIG. 7).

Here, it is assumed that the personal information processing unit 105 performs the processing of inquiring the first user about the propriety of the usage of the personal information as in the modified example. In this case, in the modified example, the propriety determination unit 104 changes the criterion based on a history of determining the propriety of the usage of the personal information by the first user. The propriety determination unit 104 determines a tendency (=disclosure tendency) of disclosure of the personal information of the first user, for example, based on a history of determining the propriety for the usage of the personal information by the first user.

The propriety determination unit 104 determines the disclosure tendency, for example, in three stages of aggressive, intermediate, and passive. The propriety determination unit 104 uses, for example, a personal information table in which user relationships in the personal information table illustrated in FIG. 7 and personal information inappropriate to the message are associated with each disclosure tendency.

Figure 13:
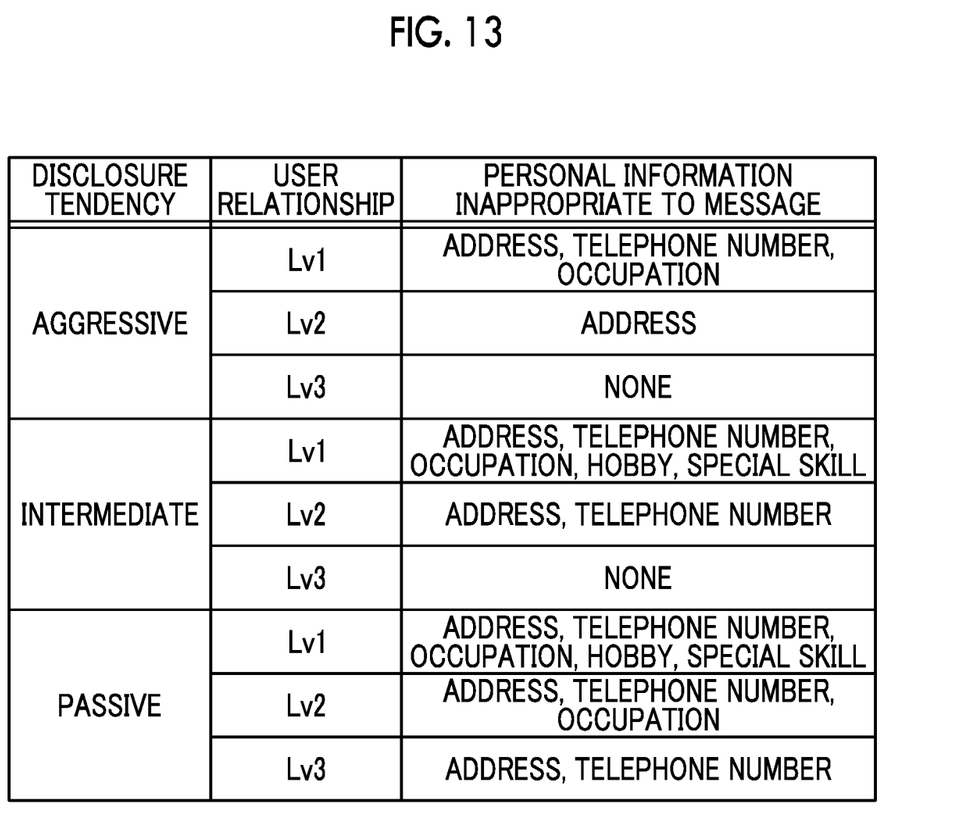
FIG. 13 is a diagram showing an example of a personal information table according to the modified example.

FIG. 13 shows an example of the personal information table of the modified example. In the example of FIG. 13, in the disclosure tendency "intermediate", the user relationship is associated with the personal information inappropriate to the message as the same as in FIG. 7.

In the disclosure tendency of "aggressive", the association is performed such that the amount of personal information inappropriate to the message is smaller than the "intermediate". Further, in the disclosure tendency of "passive", the association is performed such that the amount of personal information inappropriate to the message is larger than the "intermediate". The propriety determination unit 104 determines the disclosure tendency to be "passive" in a case where, for example, a ratio of the number of times that the first user determines that the usage of the personal information is appropriate to the number of times that the first user determines that the usage of the personal information is inappropriate is smaller than a first threshold value.

In addition, the propriety determination unit 104 determines the disclosure tendency to be the "intermediate" in a case where the ratio is equal to or larger than the first threshold and is smaller than a second threshold, and determines the disclosure tendency to be "aggressive" in a case where the ratio is equal to or larger than the second threshold. The propriety determination unit 104 uses the personal information inappropriate to the message associated with the determined disclosure tendency and the determined user relationship in the personal information table to make the determination in the same manner as in the example.

In the example of FIG. 13, since the first user who is in a tendency of aggressively disclosing the personal information, the amount of personal information inappropriate to the message is small, the propriety determination unit 104 easily transmits a message including the personal information. As described above, according to the modified example, the partner to which the personal information is informed is appropriately managed after reflecting a tendency of determination related to the personal information of the first user. Note that, although only the disclosure tendency of the first user is determined in the example, a disclosure tendency of a plurality of users including users other than the first user may be determined.

The plurality of users are, for example, a plurality of users belonging to a group to which the first user belongs. In this case, the propriety determination unit 104 changes the criterion based on the history of determining the propriety of the usage of the personal information by the plurality of users including the first user. The propriety determination unit 104 determines the disclosure tendency of the personal information of the plurality of users based on, for example, the history of determining the propriety of the usage of the personal information by the plurality of users belonging to the above-described group.

As a method of determining cases of the plurality of users, for example, the determination may be performed as the same as in a case where the number of users is one using the average value of the above-mentioned ratio of each user (the ratio of the number of times that it is determined that the usage of the personal information is appropriate to the number of times that it is determined that the usage of the personal information is inappropriate). As described above, in a case where the history of determining the plurality of users is used, the partner to which the personal information is informed is appropriately managed after reflecting the tendency of the determination related to the personal information of the plurality of users.

[2-3] Functional Configuration

A method of realizing the functions shown in FIG. 4 in the personal information management support system 1 is not limited to the method described in the example. For example, the server apparatus 10 may include all components in one housing, or may include the components distributed into two or more housings like computer resources provided in a cloud service.

In addition, for example, although the relationship determination unit 103 determines the user relationship using the first method (method of using the number of messages) and the second method (method of using the registration information) in the example, separate functions may perform determination processing using the methods. In addition, for example, one function may perform the operations performed by the propriety determination unit 104 and the personal information processing unit 105. In short, in a case where the functions shown in FIG. 4 are realized as the entire personal information management support system, a configuration of the device that realizes each function and a range of the operation performed by each function may be freely determined.

[2-4] Processor

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiment above, the term "processor" is broad enough to encompass one processor or plural processors in collaboration which are located physically apart from each other but may work cooperatively. The order of operations of the processor is not limited to one described in each exemplary embodiment above, and may be changed.

[2-5] Category of Invention

The present invention may be understood as, in addition to each information processing apparatus including the server apparatus 10 and the user terminal 20, an information processing system (the personal information management support system 1 is an example) the information processing apparatus. In addition, the present invention may be understood as an information processing method for realizing the processing executed by each information processing apparatus, and may be understood as a program for causing a computer that controls each information processing apparatus to function. This program may be provided in a form of a recording medium, such as an optical disk, whish stores the program, or may be provided in a form of being downloaded to the computer via the communication line, such as the Internet, and being installed to be usable.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a storage device;
   a communication device; and
   a processor coupled to the communication device and the storage device and configured to:
      receive through the communication device a plurality of messages from multiple users and store the plurality messages in the storage device;
      determine, from the plurality of messages, an amount of messages exchanged between a first user and a second user;
      determine a relationship level out of multiple possible relationship levels between the first user and the second user based on the amount of messages,
      determine a disclosure tendency level out of multiple possible disclosure tendency levels based on a history of determining proprieties of personal information for the first user as each of the disclosure tendency level out comprises the multiple possible relationship levels,
      determine a propriety of each of personal information included in a first message which is sent from the first user to the second user based on the determined relationship level of the determined disclosure tendency level,
      determine whether to modify each of the personal information based on the determined propriety of each of the personal information included in the first message, and
      modify automatically the first message by obscuring each of the personal information determined to be inappropriate included in the first message while leaving the rest of the first message unchanged in response to not receiving a permission from the first user to transmit the first message unchanged.

2. The information processing apparatus according to claim 1,
   wherein the processor is further configured to perform a processing of prohibiting transmission of the first message including the personal information.

3. The information processing apparatus according to claim 1,
   wherein the processor is further configured to perform a processing of transmitting the message after deleting the personal information.

4. The information processing apparatus according to claim 1, wherein the processor is further configured to perform a processing of substituting the personal information with another information which is a different type of information from the personal information.

5. The information processing apparatus according to claim 1, wherein the processor is further configured to perform transmitting a second message to contact the first user as to whether or not to transmit the personal information for obtaining the permission from the first user to transmit the first message unchanged.

6. The information processing apparatus according to claim 1, wherein the processor is further configured to perform transmitting a third message to contact the first user about propriety of usage of the personal information.

7. The information processing apparatus according to claim 6, wherein determine propriety of personal information included in the third message which is sent from the first user to the second user based on the determined relationship level comprising: determine that the usage of the personal information included in the third message is appropriate in a case where the determined relationship satisfies a decided criterion, and change the criterion based on a history of determining the propriety of the usage of the personal information by the first user in response to the determined relationship having satisfied the decided criterion.

8. The information processing apparatus according to claim 6, wherein determine propriety of personal information included in the third message which is sent from the first user to the second user based on the determined relationship level comprising: determine that the usage of the personal information included in the third message is appropriate in a case where the determined relationship satisfies a decided criterion, and change the criterion based on a history of determining the propriety of the usage by a plurality of users including the first user in response to the determined relationship having satisfied the decided criterion.

9. The information processing apparatus according to claim 1, wherein modify automatically at least some of the personal information included in the first message by obscuring at least some of the personal information included in the first message comprises:
   masking or replacing a part of the first message belonging a predetermined information type corresponding to the determined relationship level of the determined disclosure tendency level while leaving the rest of the first messages unchanged.

10. The information processing apparatus according to claim 1, wherein determine the propriety of personal information included in the first message comprising: determine the relationship level out of the multiple possible relationship levels which comprises at least three discrete levels with higher relationship level indicating a closer acquaintance level between the first user and the second user, and a less amount of personal information is deemed inappropriate for a higher relationship level than for a lower relationship level.

11. The information processing apparatus according to claim 1, wherein the multiple possible disclosure tendency levels comprise an aggressive level, an intermediate level, and a passive level with more types of the personal information deemed inappropriate for the passive level than for the aggressive level.

* * * * *